United States Patent Office 3,306,629
Patented Feb. 28, 1967

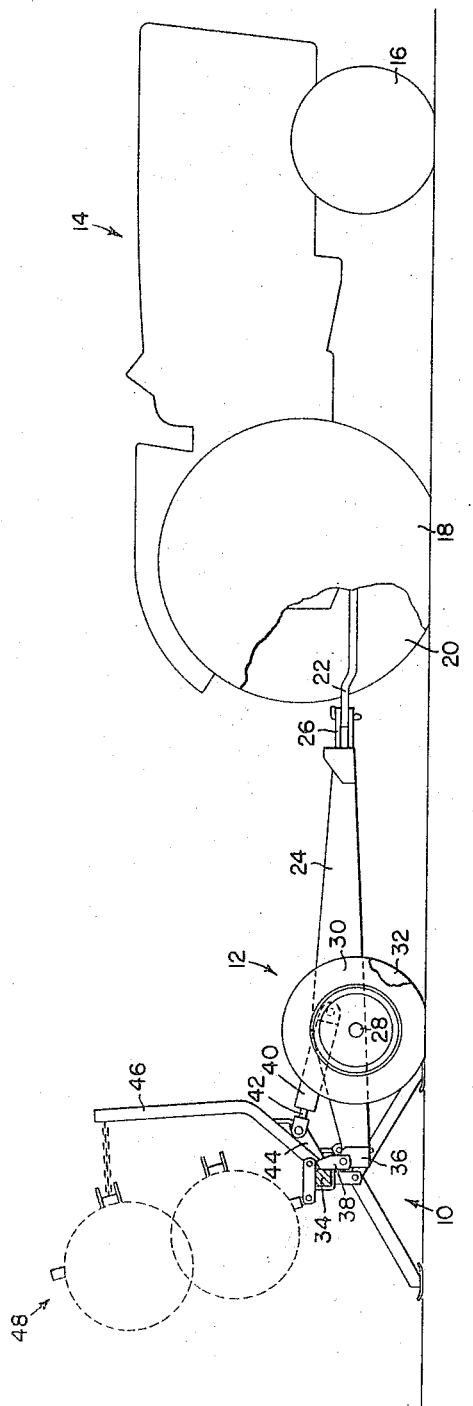

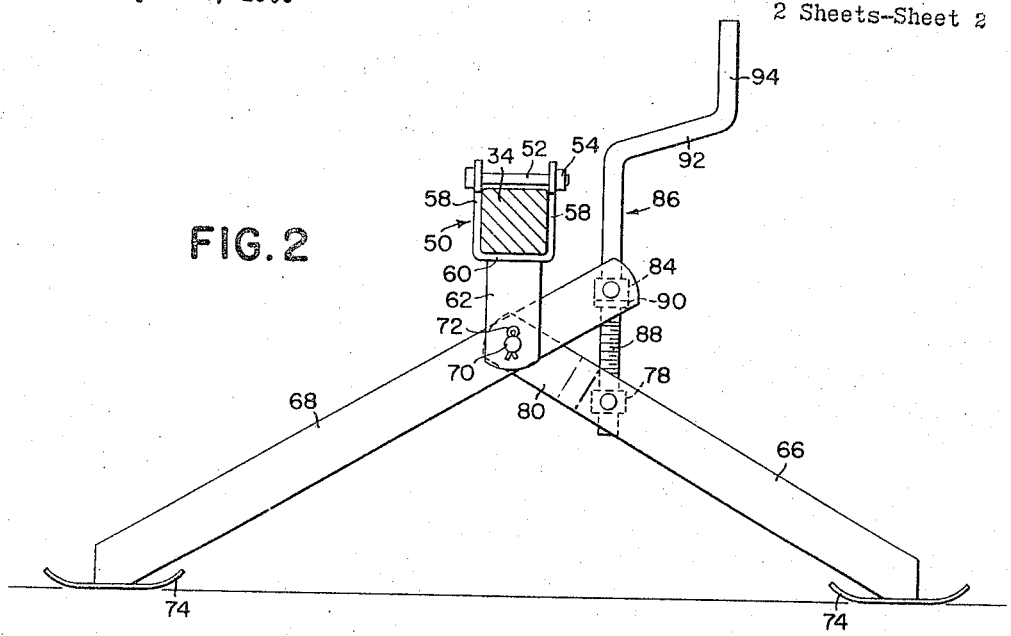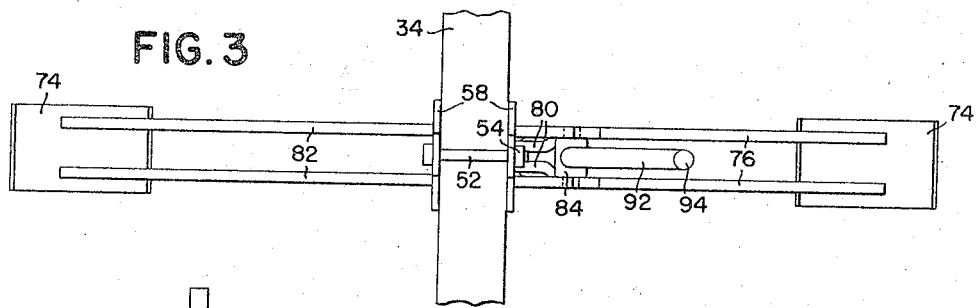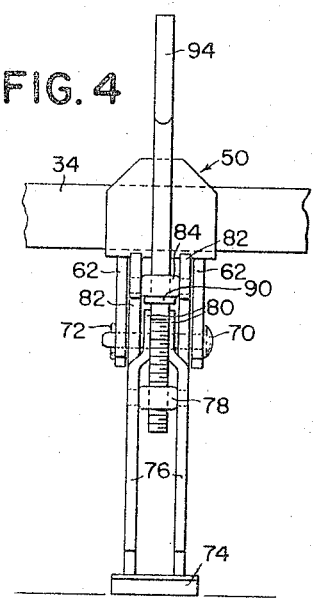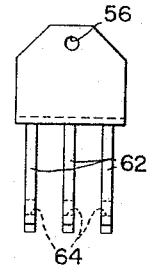

3,306,629
PARKING STAND FOR WHEELED
IMPLEMENT CARRIER
Orey W. Oerman, Moline, Ill., and William V. Lohrman, Davenport, Iowa, assignors to Deere & Company, Moline, Ill., a corporation of Delaware
Filed Sept. 10, 1965, Ser. No. 486,340
3 Claims. (Cl. 280—475)

The present invention relates generally to parking stands and more particularly to a parking stand for a wheeled implement carrier.

More particularly, it is an object of the present invention to provide an adjustable stand to be used for storage of a wheeled implement carrier and to facilitate assembly and disassembly of the carrier from a tractor. Thus when the tools carried by the carrier are in their raised transport position, the stand is attached to the tool bar of the carrier at the center of the unit and is used to raise and lower the frame to release the load at the hitch of the tractor to make for easy detaching and attaching to the tractor, and also to retain the unit in an upright position.

Another object of the present invention is to provide an adjustable parking stand having spaced apart legs, the stand being pivotally secured to an implement to take care of uneven ground or surface conditions.

These and other objects and advantages of this invention will be apparent to those skilled in the art after a consideration of the following detailed description, taken in conjunction with the accompanying drawings in which the preferred form of this invention is illustrated.

FIG. 1 shows the parking stand of this invention in combination with a tractor-drawn implement carrier.

FIG. 2 is an enlarged detailed side elevation view of the stand shown in FIG. 1.

FIG. 3 is a plan view of the stand shown in FIG. 2.

FIG. 4 is a front view of the stand shown in FIG. 2.

FIG. 5 is a front view of a portion of the stand shown in FIG. 2.

In the following description, right-hand and left-hand reference is determined by standing to the rear of the parking stand and facing the direction of travel.

The parking stand of this invention, indicated generally at 10, is shown associated with a tool carrier 12 which is in turn connected to a tractor 14. The tractor is a conventional farm tractor having forward wheel means 16 and spaced apart right and left rear wheels 18 and 20, respectively. The tractor is also provided with a drawbar 22.

The implement carrier includes a principal draft frame member 24 which carries at its forward end a clevis 26 which is securable to the tractor drawbar 22 in a conventional fashion. The draft frame member 24 carries a transversely extending axle 28 which carries on opposite ends right and left wheels 30, 32. A tool bar 34 is swingably secured to the rear end 36 of the frame 24 by means of a link 38 whose rear end is rigidly secured to the tool bar. A cylinder 40 is pivotally secured at its forward end to the draft frame member 24, the piston rod 42 of the cylinder being connected with a rock arm 44 carried by the tool bar 34 to effect swinging of the tool bar. Rigidly secured to the tool bar are spaced apart support arms 46 which normally extend rearwardly when the tool bar is disposed in its working position and upwardly when the tool bar is disposed in its transport position. In FIG. 1 the support arms are shown carrying a rotary hoe section 48, but it should be noted that other earth-working implements can be carried by the support arms, such as, for example, a peg tooth harrow.

The parking stand 10 includes, as can best be seen from FIGS. 2–5, a U-shaped hanger 50 which is formed to embrace the tool bar and is secured thereto by means of a bolt 52 and a nut 54, the bolt being received within aligned apertures 56 in the leg portions 58. The bight portion 60 faces downwardly when the tool bar 34 is in its transport position (shown in FIGS. 1 and 2). Rigidly secured to the surface of the bight portion 60 are a plurality of depending brackets 62 which are provided with aligned apertures 64.

Forward and rear jack legs 66, 68, respectively, are provided, each leg being apertured and interconnected with the depending brackets 62 by means of a pivot pin 70 which is disposed within the apertures in the legs 66, 68 and the brackets 62. The pivot bolt 70 is secured by means of a conventional cotter pin 72. Each jack leg is provided with a base 74 and is formed with two spaced apart members. The two spaced apart members 76 of the forward leg 66 are apertured between their ends and carry a swivel nut 78. Above the nut 78 the members 76 are disposed more closely to each other as can best be seen at 80 in FIGS. 3 and 4. The rear leg 68 is also provided with spaced apart members 82 which are apertured between their ends for the reception of the pivot bolt 70 and are also apertured at their upper end for the reception of an apertured swivel 84.

A jack screw 86 is provided which has a threaded lower portion 88 that is received within the threaded swivel nut 78, an intermediate portion of the jack screw 86 being provided with an abutment 90 which is adapted to contact the lower surface of the apertured swivel 84. The upper portion of the jack screw 86 is formed with an offset 92 which in turn carries a handle 94.

The operation of the parking stand should be obvious from the foregoing; however, it should be noted that the threads 88 are so arranged that rotation of the jack screw 86 in one direction will cause the swivel nut 78 to move away from the apertured swivel 84, which will in turn cause the base portions 74 to move towards each other, thereby raising the tool bar 34. If the screw is rotated in the other direction, the weight of the tool bar 34 will cause the legs to move apart, thereby permitting the rear end of the implement carrier to be lowered. The abutment 90 is held in contact with the lower surface of the apertured swivel 84 at all times by the weight of the implement which acts through the rear leg 68.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In combination with an implement carrier having a transversely extending tool bar, a forwardly extending draft frame secured at its rear end to said tool bar, ground-engaging wheel means carried by an intermediate portion of said draft means, and means on the forward end of said draft means securable to a tractor drawbar; a parking stand comprising spaced apart ground-engaging means, means hingedly interconnecting said spaced apart ground-engaging means with said tool bar, and means operable to cause said spaced apart ground-engaging means to move towards each other to raise said tool bar.

2. In combination with an implement carrier having a transversely extending tool bar, a forwardly extending draft frame secured at its rear end to said tool bar, ground-engaging wheel means carried by an intermediate portion of said draft means, and means on the forward end of said draft means securable to a tractor drawbar; a parking stand comprising an apertured depending bracket rigidly carried by said tool bar, a pair of jack legs, each having a ground-engaging portion at one end, an apertured portion, and a portion carrying a swivel, a pivot pin interconnecting said legs and said bracket, and a jack screw received within said swivels and operable to move said legs towards each other, thereby raising said tool bar.

3. In combination with an implement carrier having a transversely extending tool bar, a forwardly extending draft frame secured at its rear end to said tool bar, ground-engaging wheel means carried by an intermediate portion of said draft means, and means on the forward end of said draft means securable to a tractor drawbar, a parking stand comprising a U-shaped hanger rigidly secured to said tool bar, the bight portion of said hanger underlying the tool bar, a plurality of depending aligned brackets secured at their upper ends to said hanger, each of said brackets having an aperture therein, a first jack leg apertured at the upper end and carrying a swivel nut between its ends, a second jack leg apertured between its ends and carrying an apertured swivel at its upper end, a pivot bolt passing through the apertures in said first and second legs and said depending bracket, and a jack screw having a lower threaded portion and an intermediate portion with an abutment surface thereon, the lower portion being received within the threaded nut and the intermediate portion being disposed within the apertured swivel with the abutment in engagement with the under surface of said apertured swivel, the parts being so arranged and constructed that as the jack screw is rotated in one direction, the ground-engaging ends of said jack legs are caused to move together, thereby raising said tool bar.

References Cited by the Examiner

UNITED STATES PATENTS

| | | | |
|---|---|---|---|
| 1,457,009 | 5/1923 | Starik | 254—126 |
| 2,661,927 | 12/1953 | Hulsart | 254—126 X |
| 2,692,658 | 10/1954 | Bigio | 254—86 X |
| 3,020,063 | 2/1962 | Warren | 280—150.5 |
| 3,075,790 | 1/1963 | Hansen et al. | 280—475 |

LEO FRIAGLIA, *Primary Examiner.*